United States Patent
Hester

[15] 3,672,456
[45] June 27, 1972

[54] DEVICES FOR WEIGHING SMALL OBJECTS

[72] Inventor: Benny Lee Hester, Winston-Salem, N.C.

[73] Assignee: R. J. Reynolds Tobacco Company, Winston-Salem, N.C.

[22] Filed: June 24, 1971

[21] Appl. No.: 156,176

[52] U.S. Cl.................................177/201, 177/1, 177/207
[51] Int. Cl. .........................................................G01g 5/04
[58] Field of Search ..........................177/1, 201, 207–209, 177/212

[56] References Cited

UNITED STATES PATENTS

| | | | |
|---|---|---|---|
| 751,295 | 2/1904 | Jones | 177/201 X |
| 751,296 | 2/1904 | Jones | 177/201 X |
| 2,773,685 | 12/1956 | Aagaard | 177/212 X |

Primary Examiner—Robert S. Ward, Jr.
Attorney—Stephno & Neilan

[57] ABSTRACT

Device for rapidly weighing small, light weight objects comprising a vertical annular member having a duct open at its upper end and having a movable cylindrical member located therein. Air supply means are provided for feeding air to the bottom of the chamber to raise the cylindrical member. An escape slot is positioned in the wall of the chamber to allow for the escape of air therethrough when the bottom of the cylindrical member rises above the lowermost portion of the slot. Means are connected to the air supply means (e.g., a gauge) for determining the difference in pressure therein when an object to be weighed is placed on top of the cylindrical member and depresses the same to reduce the effective area of the slot. The device is especially suitable for weighing very light objects, such as cigarettes.

4 Claims, 1 Drawing Figure

PATENTED JUN 27 1972 3,672,456
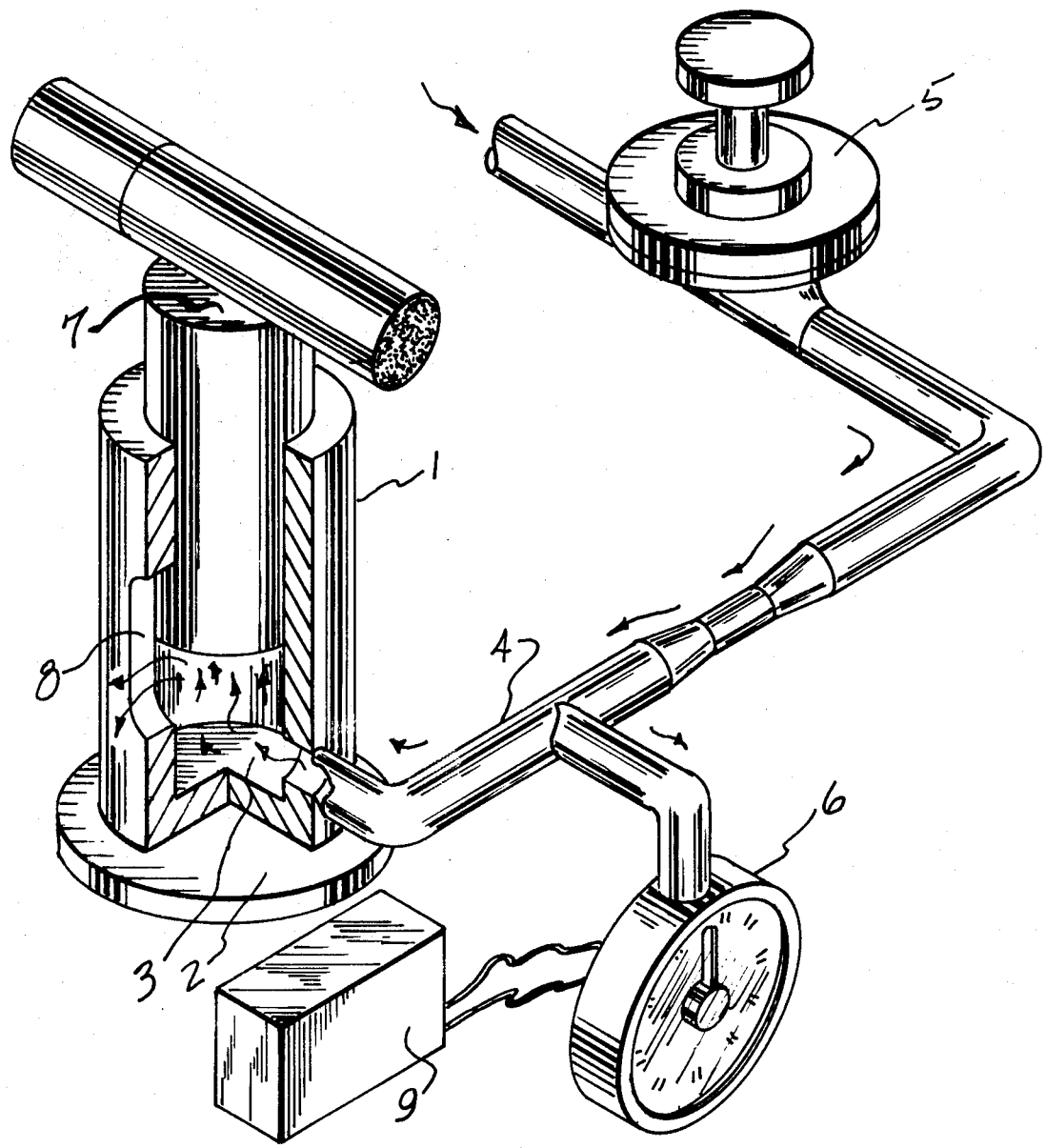
INVENTOR.
BENNY LEE HESTER
BY 3,672,456

DEVICES FOR WEIGHING SMALL OBJECTS

BACKGROUND OF THE INVENTION

This invention relates to weighing devices. More particularly, this invention relates to devices especially adapted for rapidly weighing small, light objects.

The quality control of consumer products is a recognized necessity in nearly all manufacturing operations which produce such products. As a consequence, many manufacturers have installed quality control procedures which are carried out in association with their manufacturing processes. In many manufacturing processes these quality control procedures are very rigid, both for the protection of the consumer and the benefit of the manufacturer.

In manufacturing processes wherein small objects are the product, such as cigarettes, pharmaceutical dosage tablets, small metallic or plastic objects, and the like, at least one of the steps necessary for the quality control of the objects being produced is a determination of the weight of the individual objects. This is a very tedious and time consuming operation. Due to the fact that the objects produced weigh so little, e.g., a cigarette weighs about 1 gram or less, it is extremely difficult to obtain accurate weight measurements in a short period of time. As a result, either the quality control operator expends a large amount of time in accurately determining the weight of the objects being produced for providing rigid quality control, or the objects are weighed in a short period of time, but inaccurately, which reduces the quality control standards of the operation.

Methods have been devised in an attempt to overcome the above mentioned difficulties in obtaining a rigid quality control in the manufacture of small objects; however, these methods have not proved entirely satisfactory due to either the time consumption required or the degree of error in the weight measurement.

SUMMARY OF THE INVENTION

Accordingly, it is an object of this invention to provide a device for accurately determining the weight of small, light weight objects.

It is a further object of this invention to provide a device which accurately determines the weight of small objects in a very short period of time.

It is a still further object of this invention to provide a weighing device which is simple in operation and efficient in results and which is especially suited for the weighing of small objects.

These and other objects will become apparent from the description hereinafter.

Briefly, in accordance with this invention, there is provided a weighing device which is composed of a vertical annular member having a duct passing therethrough and open at the uppermost end of said member. A cylindrical member is located within said duct and is adapted to move vertically within said duct. Means are provided to supply air to the duct at a point below the cylindrical member, and the annular member has an opening in the wall located between the air supply means and the top of the annular member. Means are also associated with the air supply means for determining the difference in the pressure of the air therein, for example, a calibrated pressure gauge. Preferably the circumference of the cylindrical member located within the duct is smaller than the circumference of the duct whereby air is permitted to flow between the walls of the cylindrical member and the duct. A preferred tolerance, i.e., distance between the wall of the duct and the wall of the cylindrical member, is between 0.003 and 0.005 inch.

BRIEF DESCRIPTION OF THE DRAWING

The drawing is a partly sectional and partly elevational view of the weighing device of this invention.

DETAILED DESCRIPTION OF THE INVENTION

The invention will be more fully understood with reference to the accompanying drawing.

IN THE DRAWING:

A vertical annular member 1, supported by base 2, has located therein a vertical duct 3 for the passage of air through the annular member. Air, from a source not shown, passes through a supply line 4 into the bottom of the annular member 1 and into duct 3. Associated with supply line 4 is a pressure regulator 5 and a pressure gauge 6. It will be appreciated that while a pressure gauge is illustrated in the drawing, any other suitable means may be used to detect the difference in pressure in line 4. When a gauge is used, it is preferably calibrated to provide a reading in the desired units. For example, when the device is used to weigh a cigarette, the gauge could be calibrated to provide a signal when the weight of the object varied, for example, plus or minus five percent from 1 gram. Located within duct 3 is a cylindrical member 7 which is adapted to freely move vertically within said duct. The wall of the annular member 1 has an escape slot 8 therein which allows for the exit of air entering duct 3 through line 4. In order to eliminate the friction factor in the operation of the weighing device of this invention, it is preferred that cylindrical member 7 be slightly smaller than duct 3; that is, the outer circumference of cylindrical member 7 is smaller than the circumference of duct 3. This allows for the passage of air upward through duct 3 which exits at the top of annular member 1 and eliminates the possibility of friction in the vertical movement of cylindrical member 7 in duct 3. A preferred tolerance, that is, space between cylindrical member 7 and the inner walls of duct 3, is between 0.003 and 0.005 inch.

It will be appreciated that since the device of this invention is to be used for weighing small objects of the character described above, the entire device operates under very low flow rate conditions. That is, the flow rate of the air passing through the supply line 4 into the duct 3 is extremely low in comparison to other devices which operate with the use of pressurized fluids, such as air.

In operation of the device of this invention, air, from a source not shown, is passed into supply line 4 and through pressure regulator 5 which is adjusted to provide the desired air pressure. The air passes from regulator 5 through line 4 into duct 3 and out through escape slot 8 thus causing cylindrical member 7 to rise within the confines of duct 3. Since preferably there is a tolerance between the walls of cylindrical member 7 and duct 3, some of the air passing from line 4 into duct 3 will escape through the top of the member 1. With this input of air, cylindrical member 7 is in effect floating within duct 3. The air pressure required to hold the cylinder in its desired position is recorded on the pressure gauge 6. The object to be weighed, e.g., a cigarette, is placed on the top of the cylindrical member 7 which causes the same to fall thereby reducing the clearance or exit area for the air exiting through slot 8. This in turn causes the pressure in duct 3 and line 4 to increase to an amount sufficient to support cylindrical member 7 at a point above the bottom of slot 8 while the object being weighed is on the cylindrical member. The back pressure built up in line 4 is immediately recorded on the pressure gauge 6 and the weight of the object thereby determined. Conveniently, pressure gauge 6 may be connected to signal means 9 which indicates to the operator that the object being weighed is beyond the acceptable deviation from the normal or desired weight thereof.

Thus, the weighing device of the instant invention provides an efficient method for weighing small, light weight objects and is simple to operate. A further advantage of the device described is the fact that the device has an extremely fast response time; that is, the weight of the object being placed on the platform is generally determined in a period of between 5 and 10 milliseconds, never more than 0.5 second. Furthermore, due to the nature of the operation of the device described, there is very little, if any, possibility of overshoot; that is, the weight indicated on the pressure gauge or other like device will very rarely, if ever, exceed the exact weight of the object placed on the movable cylindrical member.

As many apparently widely different embodiments of this invention may be made without departing from the spirit and scope thereof it is to be understood that same is not to be limited to the specific embodiments thereof except as claimed in the appended claims.

What is claimed is:

1. A weighing device comprising a vertical annular member, a duct within said member open at its uppermost end, a cylindrical member located within said duct and adapted to move vertically within said duct, means to supply air to said duct at a point below said cylindrical member, an air escape opening provided in the wall of said annular member located between said means to supply air and the top of said annular member, and means associated with said means to supply air for determining the difference in the pressure of the air therein upon an object to be weighed being placed on said cylindrical member.

2. A weighing device as described in claim 1, wherein said means for determining the difference in pressure is a calibrated pressure gauge.

3. A weighing device as described in claim 1, wherein the outer circumference of the cylindrical member is smaller than the circumference of the duct whereby air is permitted to flow between the cylindrical member and the wall of the duct.

4. A weighing device as described in claim 3, wherein the distance between the wall of the duct and the outer circumference of the cylindrical member is between 0.003 and 0.005 inch.

* * * * *